(No Model.)
W. LAMPERT.
BICYCLE HANDLE BAR GRIP.
No. 592,634. Patented Oct. 26, 1897.
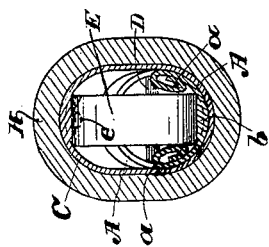
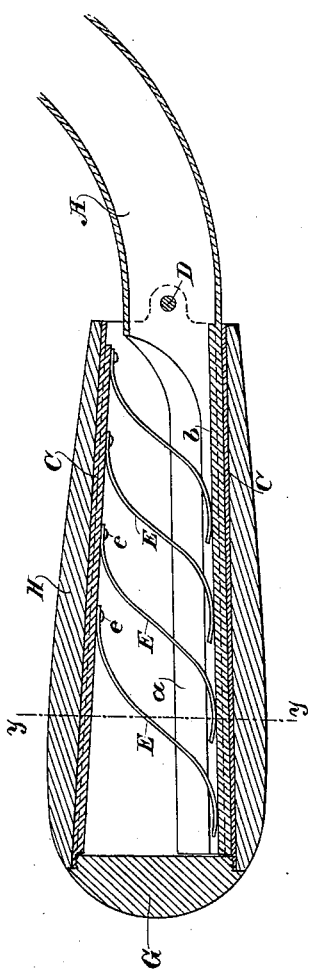
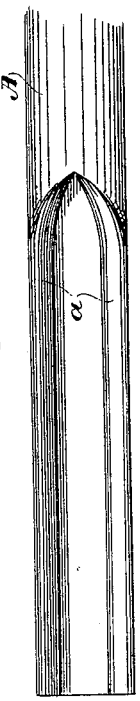
Witnesses,
J. H. Nourse
H. F. Ascheck
Inventor,
William Lampert
By Dewey & Co.
Attys

UNITED STATES PATENT OFFICE.

WILLIAM LAMPERT, OF SACRAMENTO, CALIFORNIA.

BICYCLE HANDLE-BAR GRIP.

SPECIFICATION forming part of Letters Patent No. 592,634, dated October 26, 1897.

Application filed April 6, 1897. Serial No. 630,947. (No model.)

*To all whom it may concern:*

Be it known that I, WILLIAM LAMPERT, a citizen of the United States, residing at Sacramento, county of Sacramento, State of California, have invented an Improvement in Bicycle Handle-Bar Grips; and I hereby declare the following to be a full, clear, and exact description of the same.

My invention relates to improvements in bicycle handle-bar grips. It is especially designed to provide an elastic and easy connection between the hands of the rider and the bar, whereby the jar incident to the passage of the machine over rough roads is relieved and prevented.

My invention consists in details of construction which will be more fully explained by reference to the accompanying drawings, in which—

Figure 1 is a longitudinal section showing the connection of the grip with the handle-bar. Fig. 2 is a transverse section of the same. Fig. 3 is a plan view of the handle-bar, showing the split.

The object of my invention is to provide an elastic connection between the hands of the rider and the handle-bar of the machine.

A is the handle-bar of the machine, which is slit or cut open on the top, and each of the sides is folded down, as shown at $a$, so as to form a channel with sufficiently-thickened sides. The bottom of this channel may have an additional smooth plate fitted therein, as shown at $b$, to form a surface for the movement of the springs to be hereinafter described. Surrounding this portion of the end of the handle-bar is a sleeve C, preferably made of metal, and which may be made deeper vertically than transversely, if desired. The lower part of the sleeve embraces the lower part of the handle-bar, and the inner end of it is pivoted or fulcrumed, as shown at D, so that the outer end may be depressed with relation to the outer end of the bar. Secured within this sleeve C are springs E of any suitable or desired description. In the present case I have shown these springs made of flat steel, having the upper ends firmly bolted or secured to the upper part of the sleeve C, as shown at $e$. The lower ends of the springs are curved so as to turn upwardly slightly at the ends, and the convex portion thus formed is slidable upon the bottom $b$ within the cut-away portion of the outer end of the handle-bar. The outer end of the handle may be closed, as shown at G, and the cork or other grip H incloses and covers the sleeve C in the manner that such grips are usually applied. It will be seen from this construction that whenever the rider bears his weight upon the handles, as is usually the custom when riding, the springs E will yield, thus allowing the outer end of the grip to be slightly depressed about the pivot-point D, and this allows the handle to vibrate up and down within the grip without transmitting its motion to the grip and through that to the hands and arms of the rider.

Having thus described my invention, what I claim as new, and desire to secure by Letters Patent, is—

1. A bicycle handle-bar having its outer end reduced in diameter and provided with an interior channel, a hollow grip to receive the reduced end of the bar, and pivotally secured to said bar, and springs between the grip and the channel.

2. A handle-bar of a bicycle having the outer end slit and folded from above to form an interior channel, a sleeve having exterior grips fixed thereon, said sleeve having the inner end pivoted or fulcrumed to the handle-bar, and the outer end movable about said fulcrum, and springs fixed in the interior of the upper part of the sleeve and bearing upon the bottom of the cut-away portion of the handle-bar.

3. A bicycle handle-bar having the outer end split and folded with a floor or surface in the bottom thereof, a sleeve having grip-surfaces fixed upon its outside, said sleeve being pivoted at the inner end to the handle-bar, flat S-shaped springs having the upper ends fixed to the inner top periphery of the sleeve and the lower ends adapted to slide upon the floor or plate in the bottom of the handle-bar whereby the grip is movable about the handle-bar with an elastic return pressure.

In witness whereof I have hereunto set my hand.

WILLIAM LAMPERT.

Witnesses:
S. H. NOURSE,
H. F. ASCHECK.